Oct. 1, 1935.  G. A. LYON  2,016,251
ORNAMENTAL WHEEL DISK
Filed Dec. 12, 1934
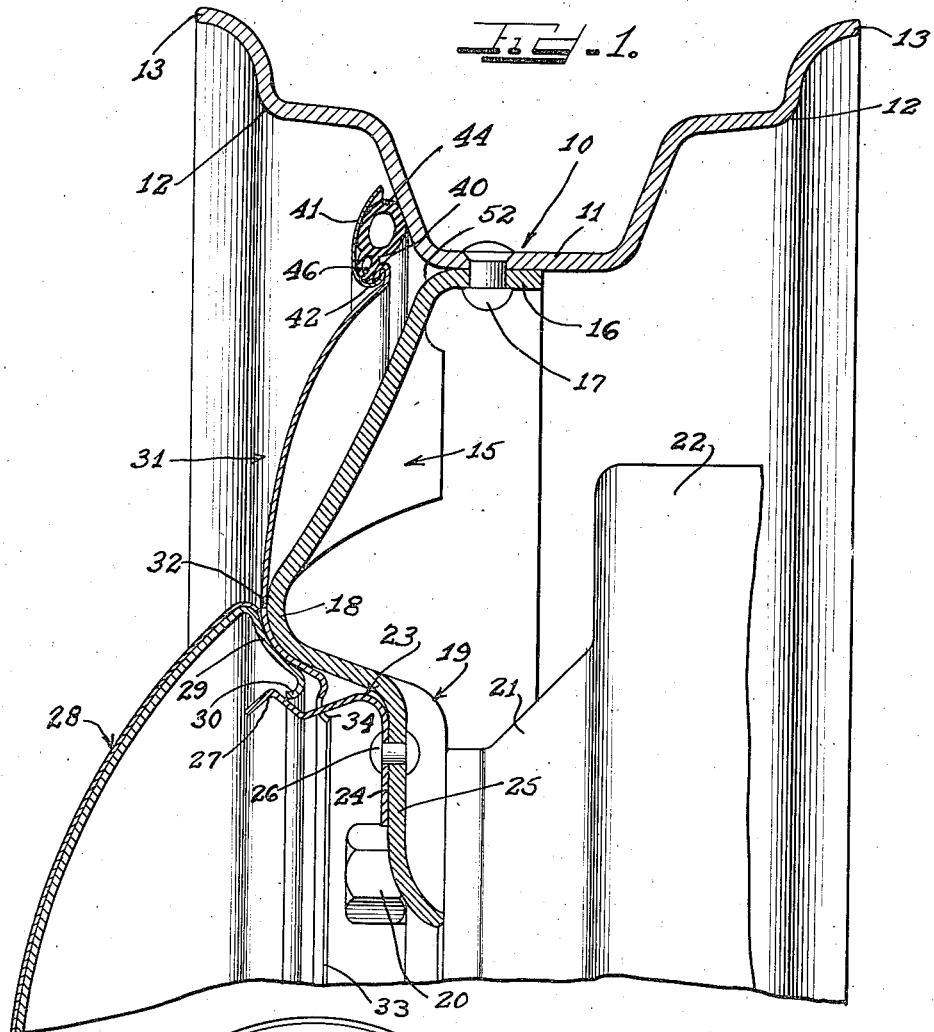
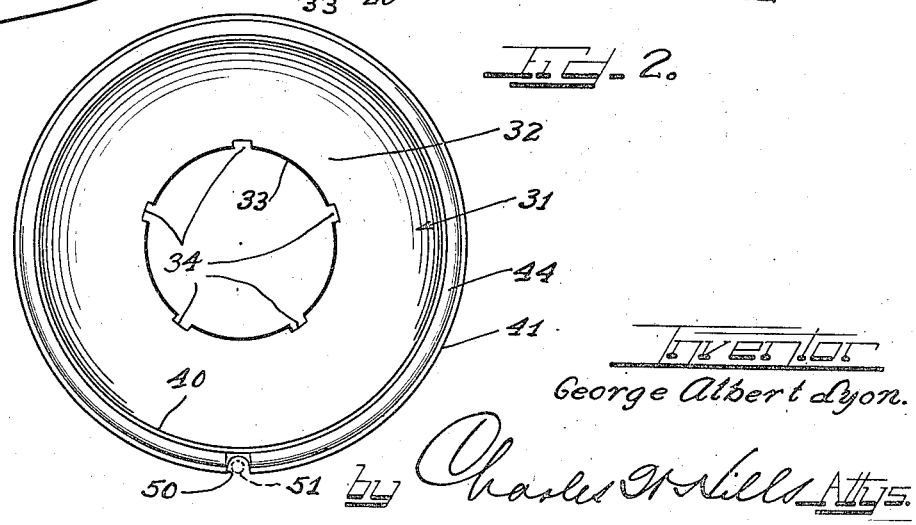
Inventor
George Albert Lyon.
by Charles W. Hills Attys.

Patented Oct. 1, 1935

2,016,251

UNITED STATES PATENT OFFICE 2,016,251

ORNAMENTAL WHEEL DISK

George Albert Lyon, Allenhurst, N. J.

Application December 12, 1934, Serial No. 757,113

6 Claims. (Cl. 41—10)

REISSUED

This invention relates to ornamental wheel disks, and more particularly to a combination ornamental disk and wheel structure.

Still more specifically, the invention relates to novel means for detachably securing an ornamental wheel disk to an outer side of a wheel.

With the advent of streamlined automotive vehicles, it has become desirable to dress up the wheels of the vehicle to conform to the exterior streamlined appointments of the other parts of the vehicle. This treatment of the wheels, however, must be accomplished with a minimum of expense, so as not to increase the cost of the vehicle.

I therefore propose to provide a combination wheel and disk structure in which the disk is easily applicable to and removable from the wheel, and which, when it is on the wheel, is so positioned and held as to eliminate substantially any tendency for it to rattle or vibrate with respect to the wheel.

Another object of the invention is to provide an ornamental disk for use in conjunction with a wheel of the type having a hub cap held in place by retaining springs carried by the wheel, and so arranged with reference to the wheel and hub cap that it may be held in place by the snapping of the hub cap into retaining engagement with the spring elements.

A still further object of the invention relates to the provision of a wheel structure in which spring retaining elements on the hub part of the wheel are utilized for the double purpose of holding a hub cap in place, and also, by reason of their engagement with the hub cap, of holding an ornamental wheel disk in place over an outer side surface of the wheel.

In accordance with the general features of this invention, there is provided an ornamental disk for use with a wheel of the type embodying rim and hub parts, the hub part of which has centrally disposed spring elements for retaining cooperation with a hub cap, the wheel disk having a central portion notched out to accommodate the spring elements, so that said elements can hold the hub cap in position on the wheel and against the central portion of the wheel disk. The wheel disk may also be provided at its outer portion with resilient means for contacting a surface of the tire rim adjacent the base of the rim, whereby the joint between the central or hub part of the wheel and the base of the tire rim flange is concealed, while at the same time there is provided a cushioned engagement between the outer portion of the disk and the wheel.

Other objects and features of this invention will more fully appear from the following detailed description, taken in connection with the accompanying drawing, which illustrates a single embodiment thereof, and in which:

Figure 1 is a fragmentary sectional view taken through an ornamental disk and wheel structure embodying the features of this invention;

Figure 2 is a rear view of the disk, showing that it is notched out at five points to accommodate the spring elements secured to the hub part of the wheel.

The reference character 10 designates generally a drop center tire rim of a wheel, which rim includes a base flange 11 opposite intermediate flanges 12, and opposite edges 13. This rim is secured to a hub or central part 15 of the wheel, which part has at its outer periphery a laterally extending flange 16 secured by means of rivets 17 or the like to the base flange 11 of the rim 10.

The hub part 15 has a turned edge or shoulder 18 adjacent the center of the wheel, as well as a circular bolting flange 19, which is adapted to be secured by five cap screws or bolts 20 to a vehicle axle part 21 which may be attached to a vehicle brake drum 22 in the usual manner.

Secured to the wheel flange 19 are five hub cap retaining spring elements 23, each of which includes a vertical leg 24 secured to an offset portion 25 of the flange 19 by means of a rivet 26 or the like. These offset portions 25 alternate with the holes in the flange 19 for accommodating the cap screws or bolts 20. This arrangement is such that the heads of the cap screws or bolts 20 are disposed in the spaces separating the offset portons 25 which carry the five spring retaining elements 23.

Each of the spring elements 23 includes a laterally or outwardly extending leg which terminates in a hook-like end 27, which is resilient and is adapted to have a hub cap snapped into engagement therewith for retaining the hub cap, which is designated generally by the reference character 28, in cooperation with the shoulder 18 of the hub part of the wheel.

The hub cap comprises a hollow shell, including an inwardly turned skirt 29, shaped to engage and bear against the shoulder 18 of the wheel hub part. This skirt 29 terminates in a turned edge 30, over which the hook-like ends 27 of the five spring elements are adapted to slide as the hub cap is forced axially into retaining engagement with the spring elements.

In accord with the features of this invention, I propose to provide a disk for covering the hub part 15 of the wheel, and adapted to be held in tight engagement therewith by having its central portion pressed into engagement with the shoulder 18 of the hub part of the wheel by the hub cap when the latter is snapped into retaining engagement with the spring elements 23.

This disk is designated generally by the reference character 31, and may be made of any suitable sheet material, such for example as thin metallic sheets. It may be either spun or formed in the punch press, as desired. The material used should, of course, be of such character as to lend itself to a high finish, which finish may correspond in color to other colors used in the vehicle, or it may be a plated finish, as desired. The central portion of the disk is turned inwardly to conform with the contour of the shoulder 18, so that such portion may tightly embrace this shoulder. This turned portion 32 terminates in an edge 33 which is adapted to be positioned inside of the central opening in the hub part. Also, this edge is notched out at five points designated by the numeral 34 in Figure 2. These notches 34 are of such size that the outwardly extending legs of the five spring elements 23 extend therethrough, as best shown in Figure 1.

It is, of course, obvious from this description, that when the hub cap 28 is snapped axially into engagement with the spring elements 23, its inner skirt 29 will bear against the turned portion 32 of the disk 31, and hold it clamped against the shoulder 18 of the hub part 15 of the wheel. Also, whenever it is desired to have access to the bolts 20, the hub cap 28 may be readily pried loose from the spring elements 23, thereby exposing the heads of the cap screws 20.

The outer portion of the disk 31 is provided with a turned edge 40 which is interlocked with an ornamental annular bead 41 of curved convex cross section. This bead 41 may comprise a split ring so that it may be contracted and expanded. It is also provided with an outwardly turned edge 42 adapted to be interlocked with the inwardly turned edge 40 of the outer periphery of the disk 31. This interlocking of the bead with the disk may be effected by contracting the split bead ring to bring its turned edge behind the turned edge 40 of the disk 31, whereby the ring, upon its subsequent expansion, will be interlocked with the disk. This annular ornamental bead 41 may be given any suitable finish, although I have attained excellent results by providing this bead with a chromium plated outer surface. Disposed behind the bead 41 is a split cushioning rubber ring 44, which has a figure eight construction. That is to say, this rubber ring 44 has a cross sectional shape resembling a numeral eight. The larger tubular portion of this rubber ring is adapted to bear against a surface of the tire rim adjacent the base flange 11. The smaller tubular portion of this rubber ring is adapted to be compressed into engagement with the interior surface of the turned edge of the metallic bead 41. In order to aid in the holding of this rubber ring in position, the smaller tubular portion thereof may be provided with an endless wire 46 disposed in the interior of such tubular portion. This wire 46 may have a diameter slightly less than the diameter of the turned edge of the disk 31, so that after the smaller end of the rubber bead is forced into engagement with the turned edge of the chromium plated bead 41, this wire will effectively aid in the retaining of the rubber bead in place.

I have previously referred to the fact that both the rubber bead 44 and the metallic bead 41 are split, and I have designated the gaps separating the ends of these two rings in Figure 2 by the reference numeral 50. While the rubber bead is discontinuous or split, the wire 46 thereon need not be, and is preferably continuous, as will be evident. Also, the gap 50 between the ends of the rubber bead and the metal bead is of such a size that the valve stem which is illustrated in dotted lines at 51 in Figure 2 may extend therethrough. By valve stem, I mean the conventional valve stem used with the inner tube of the tire which may be disposed on the tire rim 10.

The rubber bead 44 provides for a cushioned engagement between the outer portion of the disk and the inner surface of the flanged tire rim. The metallic bead 41 also serves to increase the diameter of the disk to such an extent that the joint between the base flange 11 and the flange 16 of the wheel, which joint is indicated by the reference character 52 in Figure 1, is concealed by the disk. This feature is desirable, inasmuch as this joint is usually a place where dirt and other foreign matter accumulate, much to the detriment of the normal appearance of the wheel, when such a wheel does not have a disk embodying the features of my invention described hereinabove.

From the foregoing, it will be evident that I have provided for the clamping of an ornamental disk in position over an outer surface or side of a wheel, without necessitating the use of any additional fastening or securing means, other than that which is already present to hold a hub cap in position at the center of the wheel. Thus, the hub cap retaining spring elements 23 are enabled to carry out another function, namely, that of holding the disk in tight cooperation with the central portion of the wheel, in addition to their normal and intended function of holding the hub cap in position. This clamping engagement is effected by reason of the central portion of the disk extending between the shoulder 18 of the wheel and the skirt 29 of the hub cap, so that when the hub cap is snapped into engagement with the spring elements 23, it also serves to clamp the turned portion 32 of the disk tightly against the central shoulder or ridge 18 of the hub part 15 of the wheel.

It is, of course, to be understood that while I have illustrated and described in detail the preferred form of this invention, the invention is not to be thus limited, but only insofar as defined by the scope of the appended claims.

I claim as my invention:

1. The combination with a wheel including integral rim and hub parts, of an ornamental unitary circular disk of relatively thin sheet material for disposition inside the rim part over the outer side of the wheel, and held in cooperation with the rim part solely by a snap-on engagement with the hub part, said hub part of the wheel having a plurality of central hub cap retaining spring elements, as well as a hub cap in cooperation therewith, and said disk having a central portion disposed between the hub cap and the hub part so as to be clamped into position by the snapping of the hub cap into retained engagement with the spring elements.

2. The combination with a wheel including integral rim and hub parts, of an ornamental unitary circular disk of relatively thin sheet material for disposition inside the rim part over the outer side of the wheel, and held in cooperation with the rim part solely by a snap-on engagement with the hub part, said hub part of the wheel having a plurality of central hub cap retaining spring elements, as well as a hub cap in cooperation therewith, and said disk having a central portion disposed between the hub cap and the hub part so as to be clamped into position by the snapping of the hub cap into retained engagement with the spring elements, said disk also having its central portion provided with a plurality of notches through which the spring elements extend, whereby the spring elements are free to be flexed into retaining engagement with the hub cap without any interference from the central portion of the disk.

3. The combination with a wheel including rim and hub parts, of an ornamental unitary circular member of relatively thin sheet material for disposition over the outer side of the wheel, said hub part having a centrally projecting annular hub cap seat and a plurality of hub cap retaining spring elements inwardly of the seat, as well as a hub cap adapted to be snapped axially into retained engagement with said elements, and said disk having a central portion disposed between a flange of the hub cap and said seat, so as to be clamped into position by the snapping of the hub cap into retained engagement with the spring elements.

4. The combination with a wheel including integral rim and hub parts, of an ornamental unitary circular disk of relatively thin sheet material for disposition inside the rim part over the outer side of the wheel, said hub part having a centrally projecting annular hub cap seat and a plurality of hub cap retaining spring elements inwardly of the seat, as well as a hub cap adapted to be snapped axially into retained engagement with said elements, and said disk having a central portion disposed between a flange of the hub cap and said seat, so as to be clamped into position by the snapping of the hub cap into retained engagement with the spring elements, said disk also having its central portion inwardly from said seat on the hub part provided with a plurality of notches through which the spring elements extend.

5. An ornamental unitary wheel disk for disposition over the outer side of a wheel, which wheel includes integral rim and hub parts, the disk being of relatively thin sheet material, and of such a size as to be disposed inside the rim part and to cover substantially the entire outer surface of the wheel hub part, the outer portion of the disk being provided with means for yieldably engaging the rim part of the wheel, and the central portion of the disk comprising an inwardly turned annular flange shaped to conform with the outer contour of a hub cap flange, as well as to conform with the contour of a central hub cap seat on the hub part of the wheel, whereby the disk may be clampingly secured to the hub part by a hub cap snapped into retaining engagement with spring elements carried by the wheel hub part.

6. An ornamental unitary wheel disk for disposition over the outer side of a wheel, which wheel includes integral rim and hub parts, the disk being of relatively thin sheet material, and of such a size as to be disposed inside the rim part and to cover substantially the entire outer surface of the wheel hub part, the outer portion of the disk being provided with means for engaging the rim part of the wheel, and the central portion of the disk comprising an inwardly turned annular flange shaped to conform with the outer contour of a hub cap flange, as well as to conform with the contour of a central hub cap seat on the hub part of the wheel, whereby the disk may be clampingly secured to the hub part by a hub cap snapped into retaining engagement with spring elements carried by the wheel hub part, said flange of the disk terminating in an inner edge provided with a plurality of notches, through which the hub cap retaining spring elements may extend, whereby the spring elements are free to be flexed into retaining engagement with the hub cap without any interference from the central portion of the disk.

GEORGE ALBERT LYON.

CERTIFICATE OF CORRECTION.

Patent No. 2,016,251.  October 1, 1935.

GEORGE ALBERT LYON.

It is hereby certified that error appears in the printed specification of the above numbered patent requiring correction as follows: Page 3, first column, line 24, claim 3, for "disk" read member; and that the said Letters Patent should be read with this correction therein that the same may conform to the record of the case in the Patent Office.

Signed and sealed this 19th day of November, A. D. 1935.

Leslie Frazer
(Seal)  Acting Commissioner of Patents.